United States Patent
Park et al.

(10) Patent No.: US 9,585,000 B2
(45) Date of Patent: Feb. 28, 2017

(54) METHOD OF PROVIDING SUBSCRIBER PROFILE OF EUICC BASED ON CHANGE OF NETWORK

(71) Applicant: KT Corporation, Seongnam-si (KR)

(72) Inventors: Chul Hyun Park, Seoul (KR); Kwan Lae Kim, Seoul (KR); Joo Young Kim, Seoul (KR); Jin Hyoung Lee, Seoul (KR); Hyung Jin Lee, Seoul (KR)

(73) Assignee: KT Corporation, Seongnam-Si (KR)

( * ) Notice: Subject to any disclaimer, the term of this patent is extended or adjusted under 35 U.S.C. 154(b) by 212 days.

(21) Appl. No.: 13/902,178

(22) Filed: May 24, 2013

(65) Prior Publication Data
US 2013/0344864 A1  Dec. 26, 2013

(30) Foreign Application Priority Data

May 25, 2012  (KR) .................. 10-2012-0055835
May 23, 2013  (KR) .................. 10-2013-0058149

(51) Int. Cl.
*H04W 4/00* (2009.01)
*H04W 8/18* (2009.01)

(52) U.S. Cl.
CPC .............. *H04W 8/18* (2013.01); *H04W 8/183* (2013.01)

(58) Field of Classification Search
USPC .... 455/411, 410, 432.1, 432.2, 432.3, 552.1, 455/418, 558
See application file for complete search history.

(56) References Cited

U.S. PATENT DOCUMENTS 8,577,337 B2 * 11/2013 O'Leary ................ 455/411
2011/0306318 A1 * 12/2011 Rodgers et al. ............. 455/410

FOREIGN PATENT DOCUMENTS

KR   10-2011-0041612 A   4/2011

* cited by examiner

*Primary Examiner* — Vladimir Magloire
*Assistant Examiner* — Sayed T Zewari
(74) *Attorney, Agent, or Firm* — Sughrue Mion, PLLC

(57) ABSTRACT

There is provided a method of providing a subscriber profile of an embedded universal circuit card (eUICC) that is performed in a terminal equipped with the eUICC. The method includes determining whether the terminal having a first subscriber profile stored therein has left a first mobile network operator (MNO) area corresponding the first subscriber profile, and when it is determined that the terminal has left the first mobile network operator area and moved into a second mobile network operator area, receiving a second subscriber profile corresponding to a second mobile network operator from a predetermined subscriber management server. In this way, it is possible to support mobile communication service by changing the mobile network operator even in the eUICC environment.

16 Claims, 5 Drawing Sheets

METHOD OF PROVIDING SUBSCRIBER PROFILE OF EUICC BASED ON CHANGE OF NETWORK

CLAIM FOR PRIORITY

This application claims priority to Korean Patent Application No. 10-2012-0055835 filed on May 25, 2012 and No. 10-2013-0058149 filed on May 23, 2013 in the Korean Intellectual Property Office (KIPO), the entire contents of which are hereby incorporated by reference.

BACKGROUND

1. Technical Field

Example embodiments of the present invention relate to a profile for identifying a subscriber in an eUICC, and more specifically, to a method of providing a subscriber profile of an eUICC that provides the subscriber profile capable of providing service in a non-service area.

2. Related Art

A universal integrated circuit card (UICC) is a smart card that is inserted into a terminal and used as a module for user authentication of a mobile network operator to which a user subscribes. The UICC may store a user's personal information, for example, short message service (SMS) files and a phonebook, and information on the mobile network operator to which the user subscribes, for example, an international mobile subscriber identity (IMSI) and a home public land mobile network (HPLMN).

The UICC is called a subscriber identity module (SIM) card in a global system for mobile communications (GSM), and a universal subscriber identity module (USIM) card in a wideband code division multiple access (WCDMA).

When the user installs the UICC in the user's terminal, user authentication is automatically performed using information stored in the UICC, so that the user can conveniently use the terminal.

Moreover, when the user replaces the terminal, the user may detach the UICC from an old terminal and install it in a new terminal, to easily replace the old terminal. By installing the UICC of a desired mobile network operator, it is possible to easily change the mobile network operator and use the terminal.

That is, in an existing UICC environment, a prepared SIM profile is embedded in a separate card according to requirements of the mobile network operator (MNO), and the card is distributed separately from the terminal. In order to subscribe to services of a specific mobile network operator, the user purchases a terminal and a UICC, inserts the UICC into the terminal, actives the terminal according to activation procedures set by the operator, and then uses the terminal.

Therefore, when an international prepaid UICC is replaced, the user purchases a new local prepaid UICC and installs it in place of an old UICC in order to use the terminal.

However, in an embedded UICC (hereinafter referred to as an 'eUICC'), which is integrally installed in the terminal, the eUICC is built into the terminal when the terminal is manufactured and released, unlike the existing detachable UICC. Due to its non-detachable physical structure, it is difficult to change the MNO by detaching the eUICC.

SUMMARY

Accordingly, example embodiments of the present invention are provided to substantially obviate one or more problems due to limitations and disadvantages of the related art.

Example embodiments of the present invention provide a method of providing a subscriber profile of an eUICC (embedded universal integrated circuit card) that can support mobile communication service even when a mobile terminal moves into a non-service area.

In some example embodiments, a method of providing a subscriber profile that is performed in a terminal equipped with an eUICC includes determining whether the terminal having a first subscriber profile stored therein has left a first mobile network operator (MNO) area corresponding the first subscriber profile, and receiving a second subscriber profile corresponding to a second mobile network operator from a predetermined subscriber management server when it is determined that the terminal has left the first mobile network operator area and moved into a second mobile network operator area.

The receiving of the second subscriber profile may include receiving a subscriber profile update command and the second subscriber profile from the subscriber management server, and updating the first subscriber profile to the second subscriber profile corresponding to the received subscriber profile update command.

The updating to the second subscriber profile, the first subscriber profile may be deactivated and the second subscriber profile may be activated.

The updating to the second subscriber profile may include backing up the first subscriber profile in a subscriber profile storage managed by the subscriber management server and activating the second subscriber profile.

The receiving of the second subscriber profile may include requesting, by the terminal, the second subscriber profile from a predetermined first server, receiving the subscriber profile update command and the second subscriber profile from the subscriber management server that has received information on the requested second subscriber profile from the first server, and updating the first subscriber profile to the second subscriber profile corresponding to the received subscriber profile update command.

The first server may be an application store server in the second mobile network operator area.

After the second subscriber profile is received, it is determined whether the terminal has moved into the first mobile network operator area. When it is determined that the terminal has moved into the first mobile network operator area, restoration of the first subscriber profile may be requested from the subscriber management server and the first subscriber profile may be restored from the subscriber management server.

In the restoring of the first subscriber profile, the terminal may receive a subscriber profile restore command from the subscriber management server, and the second subscriber profile may be deactivated and the first subscriber profile may be activated corresponding to the received subscriber profile restore command.

In the restoring of the first subscriber profile, the terminal may receive the subscriber profile restore command from the subscriber management server and the first subscriber profile from the subscriber profile storage, and the second subscriber profile may be deactivated and the first subscriber profile may be activated corresponding to the received subscriber profile restore command.

The second subscriber profile based on location information of the terminal and information of the eUICC may be subscriber profile information including at least one of mobile network operator information, charges information, and billing period information.

In other example embodiments, a method of providing a subscriber profile of an eUICC that is performed in a subscriber management server includes receiving a second subscriber profile request corresponding to a second mobile network operator from a terminal equipped with an eUICC that has moved from a first mobile network operator area into a second mobile network operator area, and transmitting a second subscriber profile and a subscriber profile update command to the terminal corresponding to the received second subscriber profile request.

The transmitting of the second subscriber profile and the subscriber profile update command may include receiving a first subscriber profile backup request corresponding to the first mobile network operator from the terminal, and storing the first subscriber profile whose backup is requested in a subscriber profile storage.

After the second subscriber profile and the subscriber profile update command are transmitted, a first subscriber profile restore request may be received from the terminal, and the first subscriber profile restore command and the first subscriber profile backed up in the subscriber profile storage may be transmitted corresponding to the received first subscriber profile restore request.

After the second subscriber profile and the subscriber profile update command are transmitted, the first subscriber profile restore request may be received from the terminal and a first subscriber profile restore command may be transmitted corresponding to the received first subscriber profile restore request.

In the receiving of the second subscriber profile request, the terminal may request the second subscriber profile from a predetermined first server, and receive location information of the terminal, eUICC information of the terminal, and the second subscriber profile from the first server.

According to the method of providing a subscriber profile of an eUICC described above, it is possible to purchase a subscriber profile that supports mobile communication service even in a non-service area. Moreover, it is possible to back-up or restore a profile and manage history.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Accordingly, while the invention is susceptible to various modifications and alternative forms, specific embodiments thereof are shown by way of example in the drawings and will herein be described in detail.

It should be understood, however, that there is no intent to limit the invention to the particular forms disclosed, but on the contrary, the invention is to cover all modifications, equivalents, and alternatives falling within the spirit and scope of the invention.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the invention will be described in detail with reference to the accompanying drawings. Elements that appear in more than one drawing or are mentioned in more than one place in the detailed description will be consistently denoted by the same respective reference numerals and described in detail no more than once.

Figure 1:
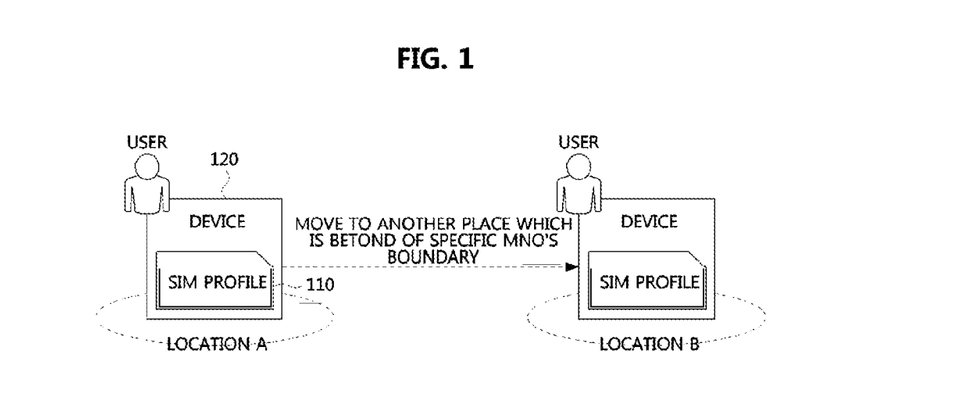
FIG. 1 is a conceptual diagram illustrating an environment in which a subscriber profile needs to be updated in a method of providing a subscriber profile of an eUICC according to an embodiment of the present invention.

FIG. 1 is a conceptual diagram illustrating an environment in which a subscriber profile needs to be updated in a method of providing a subscriber profile of an eUICC according to an embodiment of the present invention.

As illustrated in FIG. 1, when a terminal 120 equipped with an eUICC storing a first subscriber profile 110 corresponding to a first mobile network operator moves from a location A served by the first mobile network operator to a non-service area, a location B served by a second mobile network operator, the terminal 120 needs a second subscriber profile to receive mobile communication service at the location B.

In this case, the subscriber profile may be, for example, a subscriber identity module (SIM) profile.

Figure 2:
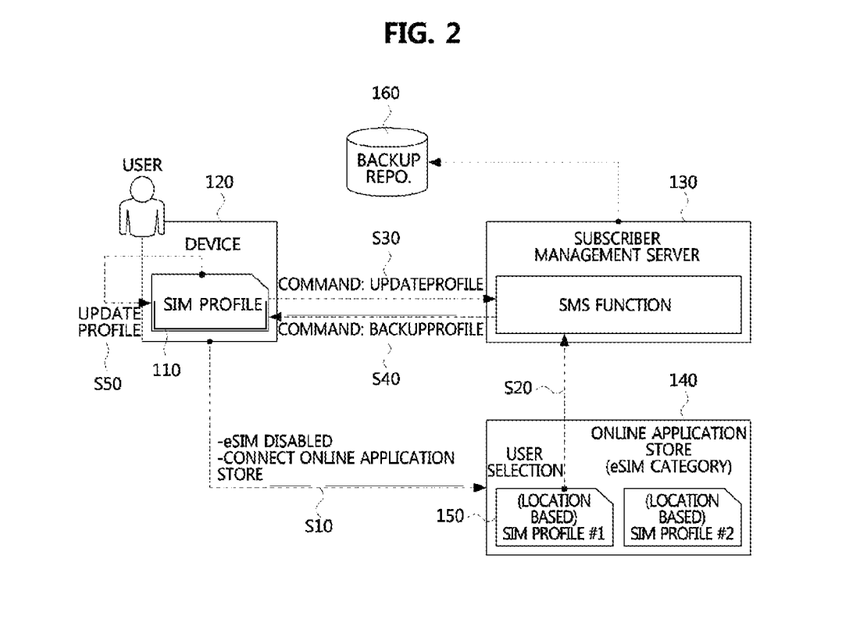
FIG. 2 is a configuration diagram illustrating a system that supports the method of providing the subscriber profile of the eUICC according to the embodiment of the present invention.

FIG. 2 is a configuration diagram illustrating a system that supports the method of providing the subscriber profile of the eUICC according to the embodiment of present the invention.

As illustrated in FIG. 2, the system that supports the method of providing a subscriber profile of an eUICC includes, the terminal 120 equipped with an eUICC that stores the first subscriber profile 110 corresponding to the first mobile network operator, an online application store 140 that can distribute a subscriber profile in the form of an application, a second subscriber profile 150 that is distributed from the online application store 140 in the form of an application and can be used for a certain period of time, and a subscriber management server 130 configured to manage the subscriber profile of the terminal 120 equipped with an eUICC.

The system may further include a subscriber profile storage 160 configured to store the subscriber profile managed by the subscriber management server 130.

When the terminal 120 equipped with an eUICC including an activated first subscriber profile has left a service area of the first mobile network operator (MNO) and moved into a non-service area, a service area of the second mobile network operator, the first subscriber profile 110 in use may not provide service.

In order to use the mobile communication service in the service area of the second mobile network operator, the terminal 120 equipped with an eUICC may access the online application store 140 and purchase the second subscriber profile (S10).

The terminal 120 may use unique user credentials, for example, an ID and a password, to identify a user when accessing the online application store 140, to log on to the online application store.

The online application store 140 may show currently available second subscriber profiles using, for example, global positioning system (GPS) location information, terminal location information such as location information in a network, and user information.

In this case, physical and geographical location of the user terminal and network location information may be automatically delivered from the terminal to the online application store without user input.

The online application store 140 may show, for example, a plan and billing period of each MNO to which the user can subscribe, using a user experience/user interface (UX/UI), in order for the user to select.

When the user selects and purchases one second subscriber profile 150 among second subscriber profiles shown in the online application store 140, the online application store 140 finds the subscriber management server 130 managing the eUICC of the user terminal based on the location information of the user terminal and the user information, and transmits the user information and the second subscriber profile 150 selected by the user to the subscriber management server 130 (S20).

The subscriber management server 130, having received the user information and the second subscriber profile 150 selected by the user in the online application store 140, transmits a subscriber profile update command and the second subscriber profile 150 to the terminal 120 for which the second subscriber profile 150 is requested (S30).

The terminal 120, having received the subscriber profile update command and the second subscriber profile 150 from the subscriber management server 130, deactivates the first subscriber profile or backs it up in the subscriber profile storage 160 managed by the subscriber management server (S40).

The subscriber profile storage 160 in which an existing profile is backed up may be an independent subscriber profile storage 160 managed by the subscriber management server 130.

When the subscriber profile storage 160 is not prepared and the first subscriber profile is backed up in the terminal 120, a backup command may be transmitted to the subscriber management server 130 to deliver information associated with the first subscriber profile backup to the subscriber management server 130.

The terminal 120 activates the second subscriber profile 150 after the first subscriber profile is backed up (S50).

Figure 3:
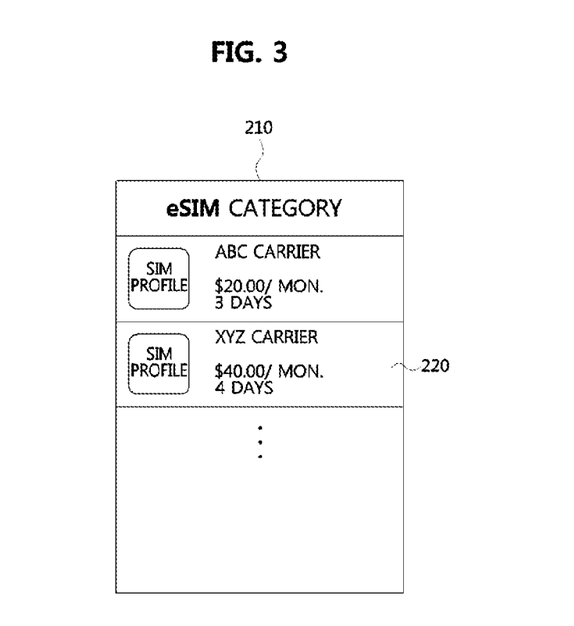
FIG. 3 is a diagram illustrating an example of a sales UX/UI shown in an online application store in the method of providing the subscriber profile of the eUICC according to the embodiment of the present invention.

FIG. 3 is a diagram illustrating an example of a sales UX/UI shown in the online application store in the method of providing the subscriber profile of the eUICC according to the embodiment of the present invention.

As illustrated in FIG. 3, a UX/UI 210 shown in the online application store displays, for example, information about a mobile network operator that can provide service and information about a billing period and usage charges, based on the location information of the user terminal and the user information, so that the user can select a subscriber profile 220.

Figure 4:
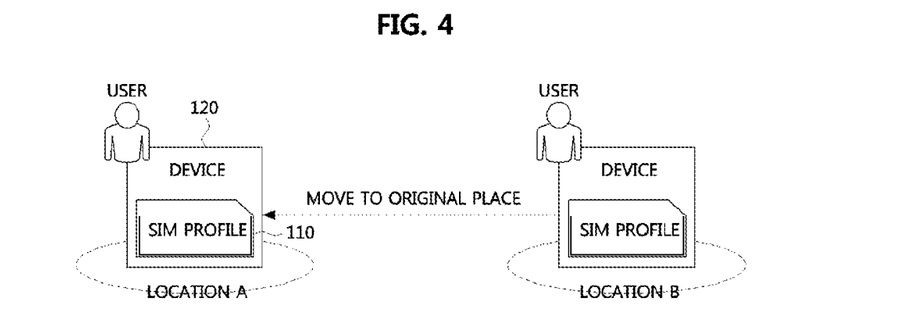
FIG. 4 is a conceptual diagram illustrating an environment in which the subscriber profile needs to be restored in the method of providing the subscriber profile of the eUICC according to the embodiment of the present invention.

FIG. 4 is a conceptual diagram illustrating an environment in which the subscriber profile needs to be restored in the method of providing the subscriber profile of the eUICC according to the embodiment of the present invention.

As illustrated in FIG. 4, when the terminal 120 equipped with an eUICC and receiving the mobile communication service using the second subscriber profile at the location B served by the second mobile network operator leaves the service area of the second mobile network operator and moves to the location A, the service area of the first mobile network operator, the terminal 120 deactivates the second subscriber profile and restores the first subscriber profile. Therefore, it is possible for the terminal to receive mobile communication service at the location A served by the first mobile network operator.

Figure 5:
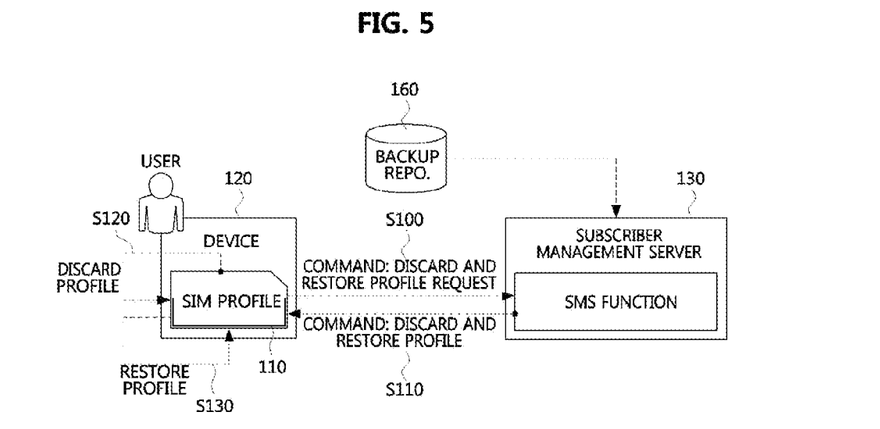
FIG. 5 is a conceptual diagram illustrating a subscriber profile restoration method in the method of providing the subscriber profile of the eUICC according to the embodiment of the present invention.

FIG. 5 is a conceptual diagram illustrating a subscriber profile restoration method in the method of providing the subscriber profile of the eUICC according to the embodiment of the present invention.

When terminal 120 equipped with an eUICC moves from the service area of the second mobile network operator into the service area of the first mobile network operator, restoration of the first subscriber profile is requested from the subscriber management server 130 (S100).

When a service period of the second subscriber profile is expired or deletion of the second subscriber profile is requested via user input, the terminal 120 equipped with an eUICC may request a second subscriber profile delete command or a first subscriber profile restore command from the subscriber management server.

The subscriber management server 130, having received the first subscriber profile restore request from the terminal 120, transmits commands to deactivate the second subscriber profile and to restore the backed-up first subscriber profile (S110).

In this case, when the backed-up first subscriber profile is not present in the terminal 120 but is present in the subscriber profile storage 160 managed by the subscriber management server 130, the backed-up first subscriber profile may also be also transmitted.

The terminal, having received the commands to deactivate the second subscriber profile and to restore the backed-up first subscriber profile from the subscriber management server 130, deactivates or removes the second subscriber profile (S120) and restores the backed-up first subscriber profile (S130).

Figure 6:
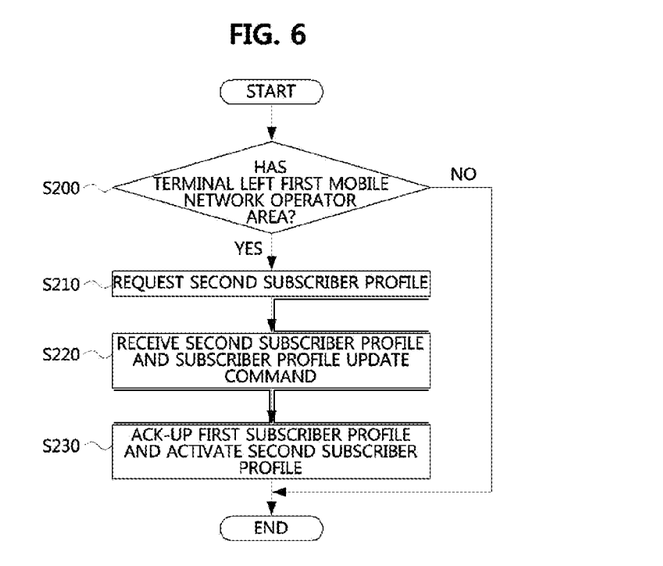
FIG. 6 is a flowchart illustrating a subscriber profile update method of a terminal in the method of providing the subscriber profile of the eUICC according to the embodiment of the present invention.

FIG. 6 is a flowchart illustrating a subscriber profile update method of the terminal in the method of providing the subscriber profile of the eUICC according to the embodiment of the present invention.

As illustrated in FIG. 6, the terminal equipped with an eUICC storing the first subscriber profile determines whether the terminal has left the first mobile network operator area that is served corresponding to the first subscriber profile (S200).

When it is determined that the terminal has left the first mobile network operator area and moved into the second mobile network operator area, the second subscriber profile, which enables provision of services from the second mobile network operator, is requested (S210).

In this case, the request for the second subscriber profile may be submitted to a predetermined subscriber management server or a predetermined first server that is accessible in the predetermined service area of the second mobile network operator.

The first server may be a server operated by the application store.

The terminal receives the second subscriber profile corresponding to the second mobile network operator and the subscriber profile update command from the predetermined subscriber management server corresponding to the request for the second subscriber profile (S220).

The terminal, having received the subscriber profile update command, backs up the first subscriber profile and activates the received second subscriber profile (S230).

In this case, the first subscriber profile may be stored in the terminal in a deactivated state as a backup. Otherwise, the profile may be transmitted to the subscriber management server in order to back it up in the subscriber profile storage managed by the subscriber management server.

Figure 7:
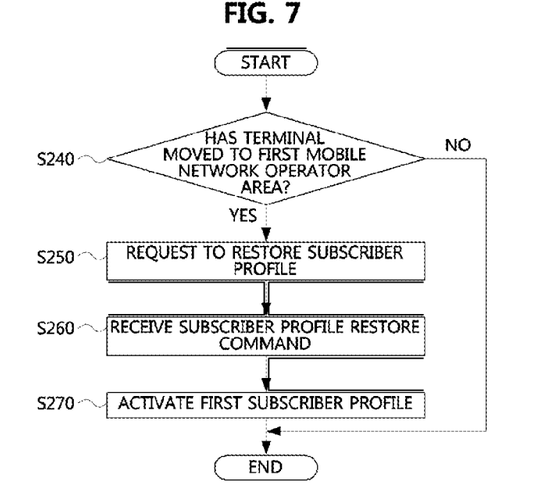
FIG. 7 is a flowchart illustrating a subscriber profile restoration method of the terminal in the method of providing the subscriber profile of the eUICC according to the embodiment of the present invention.

FIG. 7 is a flowchart illustrating the subscriber profile restoration method of the terminal in the method of providing the subscriber profile of the eUICC according to the embodiment of the present invention.

As illustrated in FIG. 7, after the second subscriber profile is received, the terminal determines whether the terminal has moved into the first mobile network operator area (S240).

When it is determined that the terminal has moved into the first mobile network operator area, restoration of the first subscriber profile is requested from the subscriber management server (S250).

The terminal receives the subscriber profile restore command corresponding to the requested first subscriber profile restoration from the subscriber management server (S260).

In this case, when the first subscriber profile is stored in the subscriber profile storage managed by the subscriber management server, the first subscriber profile may also be received from the subscriber management server.

The terminal activates the first subscriber profile corresponding to the received subscriber profile restore command (S270).

Figure 8:
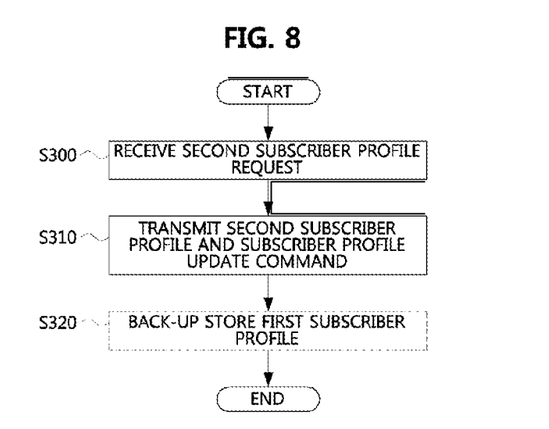
FIG. 8 is a flowchart illustrating a subscriber profile update method of a subscriber management server in the method of providing the subscriber profile of the eUICC according to the embodiment of the present invention.

FIG. 8 is a flowchart illustrating a subscriber profile update method of the subscriber management server in the method of providing the subscriber profile of the eUICC according to the embodiment of the present invention.

As illustrated in FIG. 8, the subscriber management server receives a request for the second subscriber profile corresponding to the second mobile network operator from the terminal equipped with an eUICC that has moved from the first mobile network operator area into the second mobile network operator area (S300).

The subscriber management server transmits the second subscriber profile and the subscriber profile update command to the terminal corresponding to the received second subscriber profile request (S310).

Further, according to the subscriber profile update command, when the first subscriber profile is backed up in the subscriber profile storage managed by the subscriber management server, the first subscriber profile may be stored in the subscriber profile storage (S320).

Figure 9:
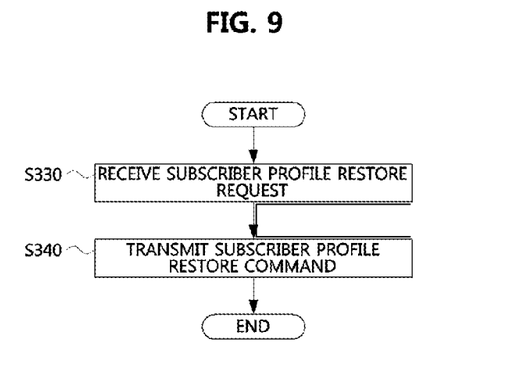
FIG. 9 is a flowchart illustrating a subscriber profile restoration method of the subscriber management server in the method of providing the subscriber profile of the eUICC according to the embodiment of the present invention.

FIG. 9 is a flowchart illustrating a subscriber profile restoration method of the subscriber management server in the method of providing the subscriber profile of the eUICC according to the embodiment of the present invention.

As illustrated in FIG. 9, after the second subscriber profile and the subscriber profile update command are transmitted, the subscriber management server receives the first subscriber profile restore request from the terminal (S330).

The subscriber management server transmits the first subscriber profile restore command corresponding to the received first subscriber profile restore request (S340).

In this case, when the first subscriber profile is backed up in the subscriber profile storage managed by the subscriber management server, the first subscriber profile may also be transmitted.

While the present invention has been described with reference to exemplary embodiments, it will be understood by those skilled in the art that various changes and modifications may be made without departing from the spirit and scope of the present invention as defined by the appended claims.

What is claimed is:

1. A method of providing a subscriber profile that is performed in a terminal equipped with an embedded universal integrated circuit card (eUICC), the method comprising:

determining whether the terminal having a first subscriber profile stored therein has left a first mobile network operator (MNO) area corresponding the first subscriber profile;

in response to the determining indicating that the terminal left the first mobile network operator area and moved into a second mobile network operator area, requesting, by the terminal, a second subscriber profile from a predetermined subscriber management server;

in response to the request, receiving the second subscriber profile corresponding to a second mobile network operator from the predetermined subscriber management server;

transmitting the first subscriber profile to the subscriber management server to be backed up in a subscriber profile storage, which is managed by the subscriber management server; and activating the second subscriber profile in response to the first subscriber profile being backed up, wherein the receiving of the second subscriber profile includes:
  requesting, by the terminal, the second subscriber profile from a predetermined first server,
  sending, by the predetermined first server, the requested second subscriber profile to the predetermined subscriber management server, and wherein the first server provides a user interface including information about a mobile network operator that can provide service, information about a billing period, and information about usage charges, based on location information of the user terminal.

2. The method of claim 1, wherein the receiving of the second subscriber profile includes:
  receiving a subscriber profile update command and the second subscriber profile from the subscriber management server; and
  updating the first subscriber profile to the second subscriber profile corresponding to the received subscriber profile update command.

3. The method of claim 2, wherein the updating to the second subscriber profile, the first subscriber profile is deactivated and the second subscriber profile is activated.

4. The method of claim 1, wherein the receiving of the second subscriber profile further includes:
  receiving a subscriber profile update command and the second subscriber profile from the subscriber management server that has received the requested second subscriber profile from the first server; and
  updating the first subscriber profile to the second subscriber profile corresponding to the received subscriber profile update command.

5. The method of claim 4, wherein the first server is an application store server in the second mobile network operator area.

6. The method of claim 1, further comprising, after the second subscriber profile is received:
  determining whether the terminal has moved into the first mobile network operator area;
  requesting restoration of the first subscriber profile from the subscriber management server when it is determined that the terminal has moved into the first mobile network operator area; and
  restoring the first subscriber profile from the subscriber management server.

7. The method of claim 6, wherein the restoring of the first subscriber profile includes:
  receiving, by the terminal, a subscriber profile restore command from the subscriber management server; and
  deactivating the second subscriber profile and activating the first subscriber profile corresponding to the received subscriber profile restore command.

8. The method of claim 6, wherein the restoring of the first subscriber profile includes:
  receiving, by the terminal, the subscriber profile restore command from the subscriber management server and the first subscriber profile from the subscriber profile storage; and
  deactivating the second subscriber profile and activating the first subscriber profile corresponding to the received subscriber profile restore command.

9. The method of claim 1, wherein the second subscriber profile based on location information of the terminal and information of the eUICC is subscriber profile information including at least one of mobile network operator information, charges information, and billing period information.

10. A method of providing a subscriber profile of an embedded universal integrated circuit card (eUICC) that is performed in a subscriber management server, the method comprising:
  receiving a second subscriber profile request corresponding to a second mobile network operator from a terminal equipped with an eUICC that has moved from a first mobile network operator area into a second mobile network operator area; and
  transmitting a second subscriber profile and a subscriber profile update command to the terminal corresponding to the received second subscriber profile request,
  wherein the receiving of the second subscriber profile request includes receiving, from a predetermined first server, the requested second subscriber profile,
  wherein the first server provides a user interface including information about a mobile network operator that can provide service, information about a billing period, and information about usage charges, based on location information of the user terminal, and
  wherein the transmitting of the second subscriber profile and the subscriber profile update command includes:
    receiving, from the terminal, a first subscriber profile backup request, along with a first subscriber profile corresponding to a first mobile network operator; and
    storing the first subscriber profile whose backup is requested in a subscriber profile storage.

11. The method of claim 10, further comprising, after the second subscriber profile and the subscriber profile update command are transmitted:
  receiving a first subscriber profile restore request from the terminal; and
  transmitting a first subscriber profile restore command and the first subscriber profile backed up in the subscriber profile storage corresponding to the received first subscriber profile restore request.

12. The method of claim 10, further comprising, after the second subscriber profile and the subscriber profile update command are transmitted:
  receiving a first subscriber profile restore request from the terminal; and
  transmitting a first subscriber profile restore command corresponding to the received first subscriber profile restore request.

13. The method of claim 10, wherein the receiving of the second subscriber profile request further includes:
  receiving location information of the terminal, eUICC information of the terminal, and the second subscriber profile from the first server.

14. The method of claim 1, wherein the first server is an application store server where the second subscriber profile is purchased in the second mobile network operator area.

15. The method of claim 10, wherein the first server is an application store server where the second subscriber profile is purchased in the second mobile network operator area.

16. The method of claim 1, wherein the transmitting the first subscriber profile to the subscriber management server comprises transmitting a first subscriber profile backup request along with the first subscriber profile, wherein the subscriber management server stores the first subscriber profile in the subscriber profile storage in response to the first subscriber profile backup request.

\* \* \* \* \*